(12) United States Patent
Serban et al.

(10) Patent No.: US 10,246,573 B2
(45) Date of Patent: Apr. 2, 2019

(54) ANTI-STATIC COMPOSITIONS

(71) Applicant: Honeywell International Inc., Morris Plains, NJ (US)

(72) Inventors: Bogdan-Catalin Serban, Bucharest (RO); Cornel P. Cobianu, Bucharest (RO); Octavian Buiu, Bucharest (RO); Mihai Brezeanu, Bucharest (RO); Alisa Stratulat, Bucharest (RO); Viorel Georgel Dumitru, Prahova (RO); Andrea Piesker, Hessen (DE); Christiane Saunier, Auten (FR); Eric Farin, Paris (FR)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 32 days.

(21) Appl. No.: 15/423,061

(22) Filed: Feb. 2, 2017

(65) Prior Publication Data

US 2017/0218179 A1 Aug. 3, 2017

(30) Foreign Application Priority Data

Feb. 2, 2016 (EP) ..................................... 16153979

(51) Int. Cl.
| | | |
|---|---|---|
| *H01B 1/12* | (2006.01) | |
| *C08K 5/42* | (2006.01) | |
| *A41D 19/00* | (2006.01) | |
| *B29C 41/00* | (2006.01) | |
| *B29C 41/14* | (2006.01) | |
| *B29C 41/42* | (2006.01) | |
| *B29D 99/00* | (2010.01) | |
| *C08L 79/02* | (2006.01) | |
| *H05F 1/00* | (2006.01) | |
| *B05D 5/12* | (2006.01) | |
| *C09K 3/16* | (2006.01) | |
| *C08G 73/02* | (2006.01) | |

(Continued)

(52) U.S. Cl.
CPC ............ *C08K 5/42* (2013.01); *A41D 19/0082* (2013.01); *B05D 5/12* (2013.01); *B29C 41/003* (2013.01); *B29C 41/14* (2013.01); *B29C 41/42* (2013.01); *B29D 99/0067* (2013.01); *C08G 73/0266* (2013.01); *C08L 79/02* (2013.01); *C09K 3/16* (2013.01); *H01B 1/128* (2013.01); *H05F 1/00* (2013.01); *A41D 19/0058* (2013.01); *B29K 2079/00* (2013.01); *B29K 2105/0026* (2013.01); *B29K 2105/0038* (2013.01); *B29L 2031/4864* (2013.01); *C08K 2201/001* (2013.01); *C08K 2201/017* (2013.01)

(58) Field of Classification Search
CPC .. C08L 95/00; C08L 2555/22; C08L 2555/26; C08L 2555/60; C08L 79/02; C08L 33/02; C08L 5/16; C08L 71/02; C08K 5/092; C08K 5/25; C08K 2201/001; C08K 2201/017; C08K 5/42; H01B 1/124–1/128; A41D 19/0058; A41D 19/0082; B05D 5/12; B29C 41/003; B29C 41/14; B29C 41/42; B29D 99/0067; B29K 2079/00; B29K 2105/0026; B29K 2105/0038; B29L 2031/4864; C08G 73/0266; C09K 3/16; H05F 1/00
See application file for complete search history.

(56) References Cited

U.S. PATENT DOCUMENTS

| | | | |
|---|---|---|---|
| 4,594,367 A | | 6/1986 | Geissel et al. |
| 4,933,106 A | * | 6/1990 | Sakai ..................... C08G 61/00 |
| | | | 205/419 |

(Continued)

FOREIGN PATENT DOCUMENTS

| | | |
|---|---|---|
| EP | 0361429 A2 | 4/1990 |
| EP | 0813212 A2 | 12/1997 |
| EP | 2441337 B1 | 4/2012 |

OTHER PUBLICATIONS

Grigoras, M. et al., "Molecular Composites Obtained by Polyaniline Synthesis in the Presence of p-Octasulfonated Calixarene Macrocycle," J. Appl. Polym. Sci. DOI: 10.1002/APP.37605, 2013 (Year: 2013).*
"2-[2-(2-Methoxyethoxy)ethoxy]acetic acid, CAS No. 16024-58-1", [online]. © 2017 Sigma-Aldrich Co. LLC. [retrieved on Feb. 16, 2017]. Retrieved from the Internet: <URL: http://www.sigmaaldrich.com/catalog/product/aldrich/407003?lang=en&region=US>, (2017), 3 pgs.
"4-Sulfocalix[4]arene, CAS No. 112269-92-8", [online]. © 2017 Sigma-Aldrich Co. LLC. [retrieved on Feb. 22, 2017]. Retrieved from the Internet: <URL: http://www.sigmaaldrich.com/catalog/product/aldrich/55523?lang=en&region=US>, (2017), 2 pgs.

(Continued)

*Primary Examiner* — Mark Kopec
*Assistant Examiner* — Jaison P Thomas
(74) *Attorney, Agent, or Firm* — Alston & Bird LLP

(57) ABSTRACT

Various embodiments disclosed relate to anti-static compositions and gloves made from the same. In various embodiments, the present invention provides a doped polyaniline comprising a dopant that is a polyacrylic acid; a polymethacrylic acid; a sulfonatocalixarene; a cyclodextrin sulfate; a compound having the structure:

$$R^2 \!\!-\!\!\!\left(\!\!-\!\!O\!\!-\!\!\right)_{\!n}\!\!-\!\!L^2\!\!-\!\!L^1\!\!-\!\!C(O)\!\!-\!\!OH,$$

wherein $R^2$ is chosen from substituted or unsubstituted ($C_1$-$C_{10}$)hydrocarbyl- and substituted or unsubstituted ($C_1$-$C_{10}$)hydrocarbyl-O—, $L^1$ is substituted or unsubstituted ($C_1$-$C_{10}$)hydrocarbylene, $L^2$ is chosen from a bond, —O—, —O—C(O)—, and —NH—C(O)—, and n is about 1 to about 100,000; a salt thereof; or a combination thereof.

22 Claims, No Drawings

(51) Int. Cl.
  *B29K 79/00* (2006.01)
  *B29K 105/00* (2006.01)
  *B29L 31/48* (2006.01)

(56) References Cited

U.S. PATENT DOCUMENTS

| | | | | |
|---|---|---|---|---|
| 5,264,552 | A * | 11/1993 | Abe | C08G 73/0266 |
| | | | | 525/539 |
| 5,993,694 | A * | 11/1999 | Ito | H01B 1/128 |
| | | | | 252/500 |
| 9,074,983 | B2 | 7/2015 | Serban et al. | |
| 2008/0306200 | A1 * | 12/2008 | Chen | B29C 41/14 |
| | | | | 524/418 |
| 2010/0040805 | A1 * | 2/2010 | Suh | C09D 5/24 |
| | | | | 428/1.4 |
| 2012/0090075 | A1 | 4/2012 | Piesker et al. | |
| 2016/0240323 | A1 * | 8/2016 | Chacko | H01G 11/04 |

OTHER PUBLICATIONS

"4-Sulfocalix[6]arene, CAS No. 102088-39-1", [online]. © 2016 ChemicalBook . . . [retrieved on Feb. 22, 2017]. Retrieved from the Internet: <URL: http://www.chemicalbook.com/ChemicalProductProperty_EN_CB1352689.htm>, (2016), 2 pgs.

"4-Sulfocalix[8]arene, CAS No. 137407-62-6", [online}. © 2016 ChemicalBook . . . [retrieved on Feb. 22, 2017]. Retrieved from the Internet: <URL: http://www.chemicalbook.com/ChemicalProductProperty_EN_CB4162993.htm>, (2016), 2 pgs.

"Alpha-Cyclodextrin Sulfate", [online], © 2016 ChemicalBook. [retrieved on Feb. 22, 2017]. Retrieved from the Internet: <URL: http://www.chemicalbook.com/ChemicalProductProperty_EN_CB7201857.htm>, (2016), 1 pg.

"Beta-Cyclodextrin, Sulfated Sodium Salt, CAS No. 37191-69-8", [online]. © 2016 ChemicalBook. [retrieved on Feb. 22, 2017]. Retrieved from the Internet: <URL: http://www.chemicalbook.com/ChemicalProductProperty_EN_CB5234691.htm>, (2016), 1 pg.

"Gamma-Cyclodextrin Sulfate, CAS No. 126881-41-2", [online]. © 2016 ChemicalBook. [retrieved on Feb. 16, 2017]. Retrieved from the Internet: <URL: http://www.chemicalbook.com/ChemicalProductProperty_EN_CB7490648.htm>, (2016), 1 pg.

"Methoxypolyethylene glycol 5,000 acetic acid greater than 80 percent", [online]. © 2017 Sigma-Aldrich Co. LLC. [retrieved on Feb. 22, 2017]. Retrieved from the Internet: <URL: http://www.sigmaaldrich.com/catalog/product/sigma/70718?lang=en&region=US>, (2017), 3 pgs.

"Methoxypolyethylene glycol 5,000 propionic acid", [online]. © 2017 Sigma-Aldrich Co. LLC. [retrieved on Feb. 16, 2017]. Retrieved from the Internet: <URL: http://www.sigmaaldrich.com/catalog/product/sigma/88908?lang=en&region=US>, (2017), 3 pgs.

"O-(2-Carboxyethyl)-O'-methyl-undecaethylene glycol", [online]. © 2017 Sigma-Aldrich Co. LLC. [retrieved on Feb. 16, 2017]. Retrieved from the Internet: <http://www.sigmaaldrich.com/catalog/product/aldrich/ 689556?lang=en&region=US>, (2017), 2 pgs.

"O-[2-(3-Succinylamino)ethyl]-O'-methyl-polyethylene glycol, CAS No. 92450-99-2", [online]. © 2017 Sigma-Aldrich Co. LLC. [retrieved on Feb. 16, 2017]. Retrieved from the Internet: <URL: http://www.sigmaaldrich.com/catalog/product/aldrich/21954?lang=en&region=US>, (2017), 3 pgs.

"O-Methyl-O'-succinylpolyethylene glycol 2'000, CAS No. 31961-02-1", [online}. [retrieved on Feb. 2, 2017]. Retrieved from the Internet: <URL: http://www.sigmaaldrich.com/catalog/product/sigma/17928?lang=en&region=US>, 3 pgs.

"O-Methyl-O'-succinylpolyethylene glycol 5'000, CAS No. 31961-02-1", [online]. © 2017 Sigma-Aldrich Co. LLC. [archived on Jul. 2, 2015; retrieved on Feb. 16, 2017]. Retrieved from the Internet: <URL: https://web.archive.org/web/20150702152948/http://www.sigmaaldrich.com/catalog/product/fluka/17929?lang=en&region=US>, (2015), 3 pgs.

"Polyaniline—Processing and Applications", [online]. [retrieved on Feb. 22, 2017]. Retrieved from the Internet: <URL: http://www.azom.com/article.aspx?ArticleID=1197>, (Jan. 16, 2002), 9 pgs.

Ghadimi, Farodeh, et al. "Polyanilines Doped with Sulphosalicylic, Salicylic and Citric Acid in Solution and Solid-State", *Iranian Polymer Journal*, vol. 11, (2002), 159-166.

Hu, Hailin, et al., "Electrically conducting polyaniline-poly(acrylic acid) blends", *Polymer International*, 45(3), (Mar. 1998), 262-270.

Kar, Prade\Ip, "Table of Contents", *Doping in Conjugated Polymer*, (Aug. 2013), 3 pgs.

MacInnes Jr., David, et al., "Poly-o-Methoxyaniline: A New Soluble Conducting Polymer", *Synthetic Metals*, vol. 25, (1988), 235 242.

McDiarmid, A. G., "Polyaniline:Protonic Acid Doping to the Metallic Regime", *Mol. Cryst. Liq. Cryst,*, vol. 125, (1985), 309-318.

Serban, B. et al., "Calixarene-Doped Polyaniline for Applications in Sensing", IEEE International Semiconductor Conference, 2006, (2006), 257-260.

Serban, B., "Sinteza si caracterizarea unei not polianiline dopata cu sulfat acid de ßciclodextrina [Synthesis and characterization of a novel functionalized conductive beta-cyclodextrine-doped polyaniline]", (Abstract Only), Revista de chimie, vol. 57, 978-980, (Sep. 2006), 1 pg.

"European Application Serial No. 16153979.6, Extended European Search Report dated Jul. 26, 2016", 6 pgs.

* cited by examiner

ANTI-STATIC COMPOSITIONS

RELATED APPLICATIONS

This application claims the benefit of priority under 35 U.S.C. Section 119 to European Patent Application Serial No. 16153979.6, filed on Feb. 2, 2016, which application is incorporated herein by reference in its entirety.

BACKGROUND

Polymer formulation with antistatic properties for glove manufacturing can be made in different ways, such as by using conductive polymers like poly(3,4-ethylenedioxythiophene)-poly(styrenesulfonate) (PEDOT-PSS) or compounds such as long-chain ethoxylated aliphatic amines and amides, quaternary ammonium salts (e.g., behentrimonium chloride or cocamidopropyl betaine), glycerol monostearate, esters of phosphoric acid polyethylene glycol esters, indium tin oxide, or polyols. Antistatic doping agents can be used with certain polymers; however, doping agents often separate from the product (e.g., "de-dope"), causing a loss of antistatic properties.

SUMMARY OF THE INVENTION

In various embodiments, the present invention provides a doped polyaniline comprising a dopant that is:

a polymer comprising a repeating unit that has the structure:

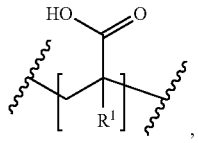

or a salt thereof,
wherein $R^1$ is chosen from —H and —CH$_3$;
a compound having the structure:

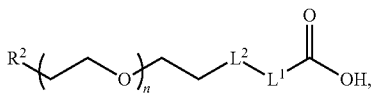

or a salt thereof,
wherein
$R^2$ is chosen from substituted or unsubstituted ($C_1$-$C_{10}$) hydrocarbyl- and substituted or unsubstituted ($C_1$-$C_{10}$)hydrocarbyl-O—,
$L^1$ is substituted or unsubstituted ($C_1$-$C_{10}$)hydrocarbylene,
$L^2$ is chosen from a bond, —O—, —O—C(O)—, and —NH—C(O)—, and
n is about 1 to about 100,000;
a sulfonatocalixarene, or a salt thereof;
a cyclodextrin sulfate, or a salt thereof; or
a combination thereof.

In various embodiments, the present invention provides a doped polyaniline comprising a dopant that is chosen from 2-[2-(2-methoxyethoxy)ethoxy]acetic acid, methoxypolyethylene glycol 5,000 acetic acid, methoxypolyethylene glycol 5,000 propionic acid, O-(2-carboxyethyl)-O'-methyl-undecaethylene glycol, O-methyl-O'-succinylpolyethylene glycol 2,000. O-methyl-O'-succinylpolycthylene glycol 5,000. O-[2-(3-succinylamino)ethyl]-O'-methyl-polyethylene glycol having an $M_n$ of about 20,000, polyacrylic acid, polymethacrylic acid, p-sulfonatocalix[4]arene, p-sulfonatocalix[6]arene, p-sulfonatocalix[8]arene, alpha cyclodextrin sulfate, beta cyclodextrin sulfate, gamma cyclodextrin sulfate, a salt thereof, and a combination thereof.

In various embodiments, the present invention provides a glove comprising a vulcanization product of a composition comprising a polyaniline comprising a dopant, the dopant having the structure:
a polymer comprising a repeating unit that has the structure:

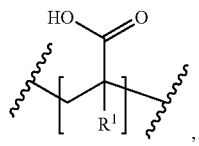

or a salt thereof,
wherein $R^1$ is chosen from —H and —CH$_3$;
a compound having the structure:

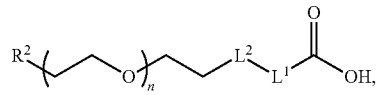

or a salt thereof.
wherein
$R^2$ is chosen from substituted or unsubstituted ($C_1$-$C_{10}$) hydrocarbyl- and substituted or unsubstituted ($C_1$-$C_{10}$)hydrocarbyl-O—.
$L^1$ is substituted or unsubstituted ($C_1$-$C_{10}$)hydrocarbylene.
$L^2$ is chosen from a bond. —O—, —O—C(O)—, and —NH—C(O)—, and
n is about 1 to about 100,000;
a sulfonatocalixarene, or a salt thereof;
a cyclodextrin sulfate, or a salt thereof; or
a combination thereof.

In various embodiments, the present invention provides a glove comprising a vulcanization product of a composition comprising a polyaniline comprising a dopant that is chosen from 2-[2-(2-methoxyethoxy)ethoxy]acetic acid, methoxypolyethylene glycol 5,000 acetic acid, methoxypolyethylene glycol 5,000 propionic acid, O-(2-carboxyethyl)-O'-methyl-undecaethylene glycol, O-methyl-O'-succinylpolyethylene glycol 2,000, O-methyl-O'-succinylpolyethylene glycol 5,000. O-[2-(3-succinylamino)ethyl]-O'-methyl-polyethylene glycol having an $M_n$ of about 20,000, polyacrylic acid, polymethacrylic acid, p-sulfonatocalix[4]arene, p-sulfonatocalix[6]arene, p-sulfonatocalix[8]arene, alpha cyclodextrin sulfate, beta cyclodextrin sulfate, gamma cyclodextrin sulfate, a salt thereof, and a combination thereof.

In various embodiments, the present invention provides a method of making a doped polyaniline, the method comprising:
doping an emeraldine free base with a dopant that is:
a polymer comprising a repeating unit that has the structure:

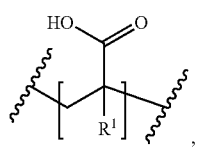

or a salt thereof,
wherein $R^1$ is chosen from —H and —CH$_3$;
a compound having the structure:

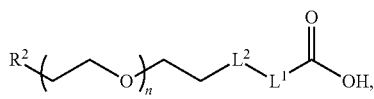

or a salt thereof,
wherein
- $R^2$ is chosen from substituted or unsubstituted ($C_1$-$C_{10}$)hydrocarbyl- and substituted or unsubstituted ($C_1$-$C_{10}$)hydrocarbyl-O—,
- $L^1$ is substituted or unsubstituted ($C_1$-$C_{10}$)hydrocarbylene,
- $L^2$ is chosen from a bond, —O—, —O—C(O)—, and —NH—C(O)—, and
- n is about 1 to about 100,000;

a sulfonatocalixarene, or a salt thereof;
a cyclodextrin sulfate, or a salt thereof; or
a combination thereof.

Various embodiments of the doped polyaniline can have certain advantages over other antistatic compositions, such as compared to other antistatic compositions that are useful for glove manufacture, at least some of which are unexpected. In various embodiments, the doped polyaniline of the present invention can be easily and inexpensively made. In various embodiments, the doped polyaniline of the present invention can have electrical properties that are reversibly controlled through the type of dopant used. In various embodiments, the doped polyaniline of the present invention can be conductive. In various embodiments, the doped polyaniline of the present invention can have a wide variety of conductivity levels. In various embodiments, the doped polyaniline of the present invention can be stable in a wide variety of environmental conditions. In various embodiments, the doped polyaniline of the present invention can have high stability under high temperature conditions. In various embodiments, the doped polyaniline of the present invention can have antioxidant properties, increasing the lifetime of the polymer. In various embodiments, the doped polyaniline of the present invention can be a melt and solution processable material.

In various embodiments, the doped polyaniline can suffer from less de-doping than other doped antistatic polymers, such as due to the large size of the dopant. In various embodiments, even when the doped polyaniline does experience some de-doping, the dopants can advantageously provide anti-static properties in a de-doped state (e.g., due to hydrophilic properties of the dopant), allowing both the doped and de-doped polyaniline to have anti-static properties. In various embodiments, the additive antistatic properties of the doped polyaniline and of the de-doped dopant can result in superior overall antistatic properties as compared to other antistatic compositions.

In various embodiments, the doped polyaniline has superior properties as compared to undoped polyaniline or polyaniline doped with other dopants, such as higher mechanical strength, and superior film-forming properties. In various embodiments, the doped polyaniline has superior processing characteristics as compared to undoped polyaniline or polyaniline doped with other dopants, such as superior melt or solution processability.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR. OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$. N(R)C(S)N(R)$_2$, N(COR)COR. N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl n-heptyl, and n-octyl groups. Examples of branched alkyl groups include, but are not limited to, isopropyl, isobutyl sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl biphenyl, indacenyl, fluorenyl, phenanthrenyl, triphenylenyl, pyrenyl, naphthacenyl chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are integers and mean having any of a to b number of carbon atoms. For example, $(C_1-C_4)$hydrocarbyl means the hydrocarbyl group can be methyl ($C_1$), ethyl ($C_2$), propyl ($C_3$), or butyl ($C_4$), and $(C_0-C_b)$hydrocarbyl means in certain embodiments there is no hydrocarbyl group.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "solvent" as used herein refers to a liquid that can dissolve a solid, liquid, or gas. Non-limiting examples of solvents are silicones, organic compounds, water, alcohols, ionic liquids, and supercritical fluids.

As used herein, the term "polymer" refers to a molecule having at least one repeating unit and can include copolymers.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The polymers described herein can terminate in any suitable way. In some embodiments, the polymers can terminate with an end group that is independently chosen from a suitable polymerization initiator, —H, —OH, a substituted or unsubstituted $(C_1-C_{20})$hydrocarbyl (e.g., $(C_1-C_{10})$alkyl or $(C_6-C_{20})$aryl) interrupted with 0, 1, 2, or 3 groups independently selected from —O—, substituted or unsubstituted —NH—, and —S—, a poly(substituted or unsubstituted $(C_1-C_{20})$hydrocarbyloxy), and a poly(substituted or unsubstituted $(C_1-C_{20})$hydrocarbylamino).

Doped Polyaniline.

In various embodiments, the present invention provides a doped polyaniline. The doped polyaniline can include a repeating group having the structure:

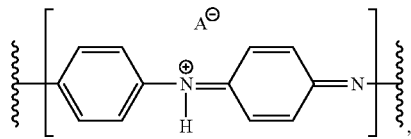

The variable $A_-$ is the conjugate base of a dopant having the structure A-H or a salt thereof.

The doped polyaniline can include repeating groups having the structure:

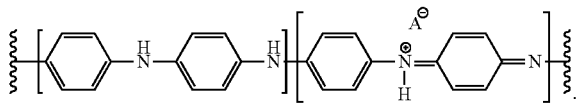

The repeating groups can be in a block or random arrangement. The variable $A^-$ can be the conjugate base of the dopant, the dopant having the structure A-H or a salt thereof.

The doped polyaniline can be formed by doping an emeraldine free base. The doping can include contacting the emeraldine free base with the dopant under conditions such that the emeraldine is protonated by the dopant and such that the cationic species formed from the protonation is forms an ion pair with the conjugate base of the dopant.

The doped polyaniline can be conductive. The doped polyaniline can have any suitable conductivity, such as about $10^{-10}$ S/cm to about 10 S/cm, or about $10^{-10}$ S/cm or less, or less than, equal to, or greater than about $10^{-9}$ S/cm, $10^{-8}$, $10^{-7}$, $10^{-6}$, $10^{-5}$, $10^{-4}$, $10^{-3}$, $10^{-2}$, $10^{-1}$, or about 10 S/cm or more.

The polyaniline can have any suitable molecular weight, such as about 1,000 to about 1,000,000, or about 5,000 to about 100,000, or about 1,000 or less, or less than, equal to, or greater than about 2,500, 5,000, 7,500 10,000, 15,000, 20,000, 25,000, 30,000, 35,000, 40,000, 45,000, 50,000, 55,000, 60,000, 65,000, 70,000, 75,000, 80,000, 85,000, 90,000, 95,000, 100,000, 150,000, 200,000, 500,000, 750,000, or about 1,000,000 or more.

Dopant.

The doped polyaniline includes a dopant. The doped polyaniline can include one dopant, or more than one dopant. The one or more dopants can form any suitable proportion of the doped polyaniline, such as about 0.001 wt % to about 99.999 wt % of the doped polyaniline, about 40 wt % to about 60 wt % of the polyaniline, or about 0.001 wt % or less, or less than, equal to, or greater than about 0.01 wt %, 0.1, 1, 2, 3, 4, 5, 6, 8, 10, 12, 14, 16, 18, 20, 25, 30, 35, 38, 39, 40, 41, 42, 43, 44, 45, 46, 47, 48, 49, 50, 51, 52, 53, 54, 55, 56, 57, 58, 59, 60, 61, 62, 65, 70, 75, 80, 82, 84, 86, 88, 90, 91, 92, 93, 94, 95, 96, 97, 98, 99, 99.9, 99.99, or about 99.999 wt % or more. The dopant can be a hygroscopic dopant. The polyaniline can be doped with any one or any suitable combination of dopants described herein. The doped polyaniline can be free of any dopant described in this section.

The dopant can be a polymer comprising a repeating unit that has the structure:

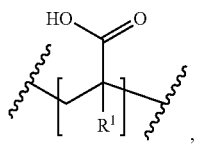

or a salt thereof,

The variable $R^1$ can be chosen from —H and —CH$_3$. The variable $R^1$ can be —H. The variable $R^1$ can be —CH$_3$.

The dopant can be a polyacrylic acid, having a repeating group having the structure:

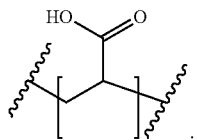

In some embodiments, the dopant is polyacrylic acid.

The dopant can be a polymethacrylic acid including a repeating unit having the structure:

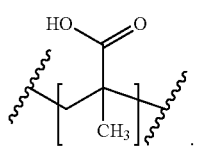

In some embodiments, the dopant is polymethacrylic acid.

The dopant can be a compound having the structure:

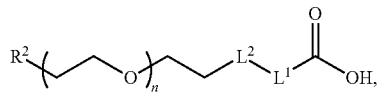

or a salt thereof.

The variable $R^2$ can be chosen from substituted or unsubstituted (C$_1$-C$_{10}$)hydrocarbyl- and substituted or unsubstituted (C$_1$-C$_{10}$)hydrocarbyl-O—. The variable $R^2$ can be chosen from (C$_1$-C$_{10}$)alkyl- and (C$_1$-C$_{10}$)alkyl-O—. The variable $R^2$ can be chosen from H$_3$C— and H$_3$C—O—. The variable $L^1$ can be substituted or unsubstituted (C$_1$-C$_{10}$) hydrocarbylene. The variable $L^1$ can be (C$_1$-C$_{10}$)alkylene. The variable $L^1$ can be chosen from methylene and ethylene. The variable $L^2$ can be chosen from a bond, —O—, —O—C(O)—, and —NH—C(O)—. The variable n can be about 1 to about 100,000, such as about 1 to about 10,000, or about 0, 1, or less than, equal to, or greater than about 2, 3, 4, 5, 6, 7, 8, 9, 10, 11, 12, 13, 14, 15, 16, 17, 18, 19, 20, 22, 24, 26, 28, 30, 35, 40, 45, 50, 60, 70, 80, 90, 100, 150, 200, 250, 300, 350, 400, 450, 500, 550, 600, 650, 700, 750, 800, 1,000, 1,500, 2,000, 2,500, 3,000, 3.500, 4,000, 4,500, 5,000, 6,000, 7,000, 8,000, 9,000, 10,000, 15,000, 20,000, 30,000, 50,000, or about 100,000 or more.

The dopant can be 2-[2-(2-methoxyethoxy)ethoxy]acetic acid, having the structure:

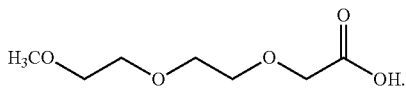 [SMILES: COCCOCCOCC(=O)O]

The dopant can be methoxypolyethylene glycol acetic acid, having the structure:

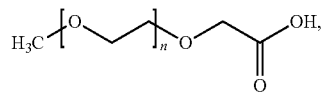

The variable n can be about 1 to about 100,000, such as about 1 to about 10,000, or about 4,000 to about 6,000, or about 5,000.

The dopant can be methoxypolyethylene glycol propionic acid, having the structure:

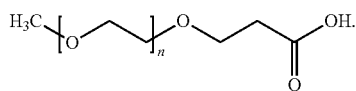

The variable n can be about 1 to about 100,000, such as about 1 to about 10,000, or about 4,000 to about 6,000, or about 5,000.

The dopant can be O-(2-carboxyethyl)-O'-methyl-undecaethylene glycol, having the structure:

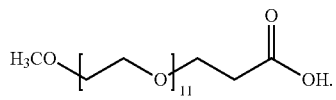

The dopant can be O-methyl-O'-succinylpolyethylene glycol having the structure:

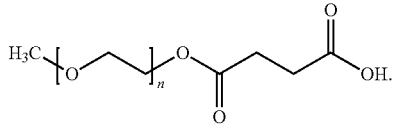

The variable n can be about 1 to about 100,000, such as about 1 to about 10,000, or about 1,000 to about 3,000, or about 2,000.

The dopant can be O-methyl-O'-succinylpolyethylene glycol, having the structure:

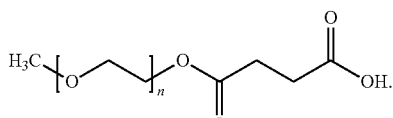

The variable n can be about 1 to about 100,000, such as about 1 to about 10,000, or about 4,000 to about 6,000, or about 5,000.

The dopant can be O-[2-(3-succinylamino)ethyl]-O'-methyl-polyethylene glycol, having the structure:

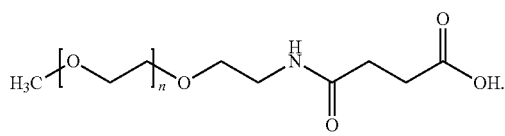

The variable n can be about 1 to about 100,000, such as about 1 to about 10,000, or about 400 to about 500, or about 450 (e.g., the PEG in the structure can have an $M_n$ of about 15,000 to about 25,000, or about 20,000)

The dopant can be chosen from 2-[2-(2-methoxyethoxy)ethoxy]acetic acid, methoxypolyethylene glycol 5,000 acetic acid, methoxypolyethylene glycol 5,000 propionic acid. O-(2-carboxyethyl)-O'-methyl-undecaethylene glycol, O-methyl-O'-succinylpolyethylene glycol 2,000. O-methyl-O'-succinylpolyethylene glycol 5,000, O-[2-(3-succinylamino)ethyl]-O'-methyl-polyethylene glycol having an $M_n$ of about 20,000, and combinations thereof.

The dopant can be a sulfonatocalixarene, or a salt thereof. The dopant can be a p-sulfonatocalix[n]arene, or a salt thereof, wherein n is an even integer that is from 4 to about 100 (e.g., 4, 6, 8, 10, 12, 14, 16, 18, 20, 22, 24, 26, 28, and the like). The dopant can be chosen from p-sulfonatocalix[4]arene, p-sulfonatocalix[6]arene, p-sulfonatocalix[8]arene, a salt thereof, and a combination thereof.

The dopant can be p-sulfonatocalix[4]arene, having the structure:

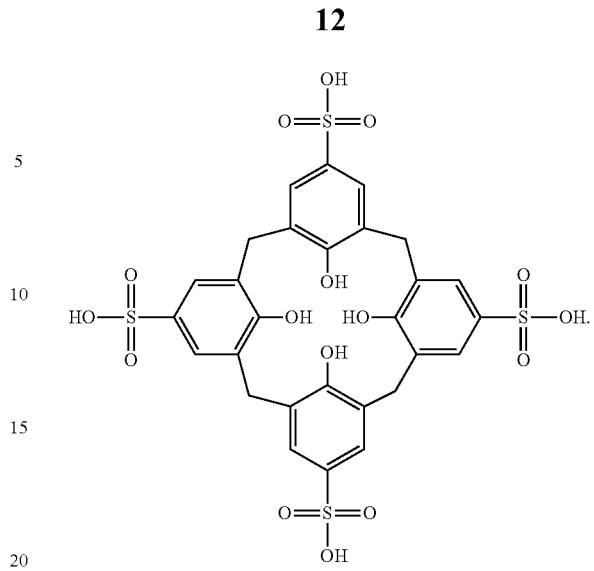

The dopant can be p-sulfonatocalix[6]arene, having the structure:

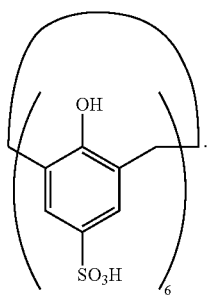

The dopant can be p-sulfonatocalix[8]arene, having the structure:

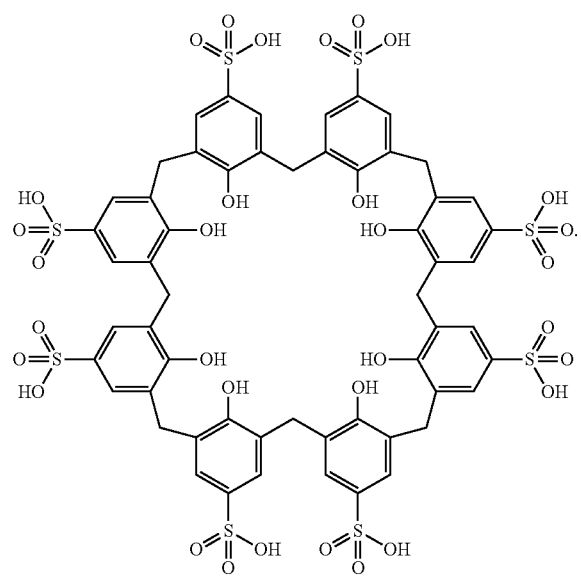 [SMILES: O=S(=O)(O)c1cc2c(O)c(c1)Cc1cc(S(=O)(=O)O)cc(c1O)Cc1cc(S(=O)(=O)O)cc(c1O)Cc1cc(S(=O)(=O)O)cc(c1O)Cc1cc(S(=O)(=O)O)cc(c1O)Cc1cc(S(=O)(=O)O)cc(c1O)Cc1cc(S(=O)(=O)O)cc(c1O)Cc1cc(S(=O)(=O)O)cc(c1O)C2]

The dopant can be a cyclodextrin sulfate, or a salt thereof. The dopant can be chosen from alpha cyclodextrin sulfate, beta cyclodextrin sulfate, gamma cyclodextrin sulfate, a salt thereof, and a combination thereof.

The dopant can be alpha cyclodextrin sulfate, having the structure:
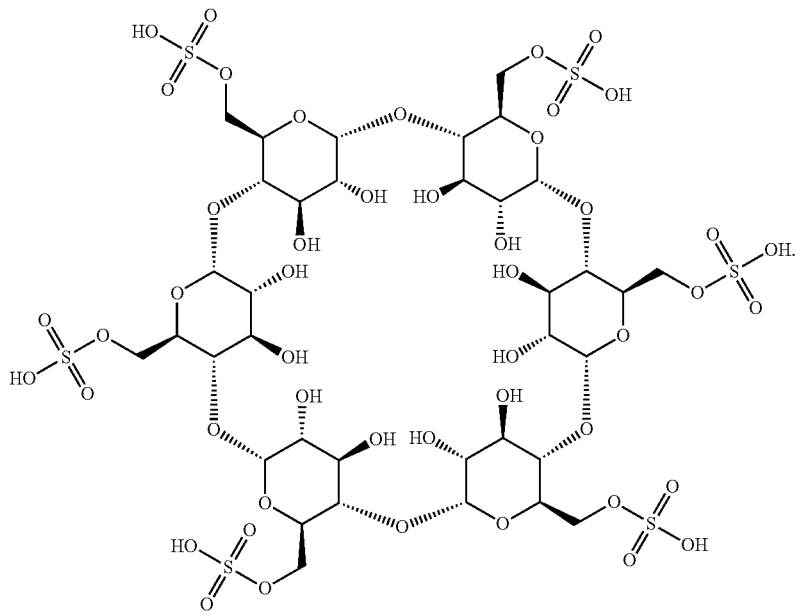 [SMILES: O=S(=O)(O)OC[C@H]1O[C@@H]2O[C@H]3[C@H](O)[C@@H](O)[C@@H](O[C@H]4[C@H](O)[C@@H](O)[C@@H](O[C@H]5[C@H](O)[C@@H](O)[C@@H](O[C@H]6[C@H](O)[C@@H](O)[C@@H](O[C@H]7[C@H](O)[C@@H](O)[C@@H](O[C@H]1[C@H](O)[C@H]2O)O[C@@H]7COS(=O)(=O)O)O[C@@H]6COS(=O)(=O)O)O[C@@H]5COS(=O)(=O)O)O[C@@H]4COS(=O)(=O)O)O[C@@H]3COS(=O)(=O)O]
The dopant can be beta cyclodextrin sulfate, having the structure:
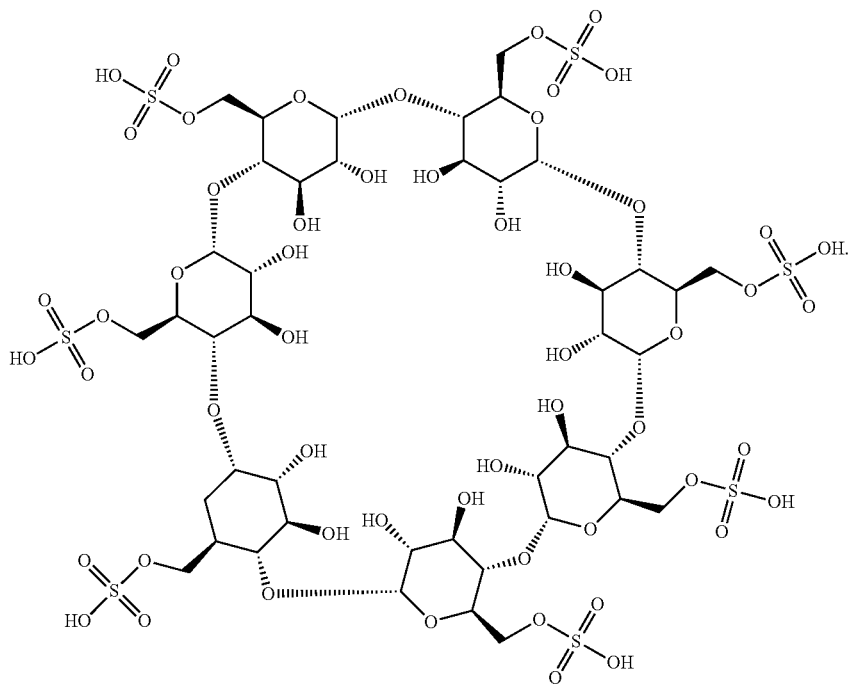 [SMILES: O=S(=O)(O)OC[C@H]1C[C@@H]2O[C@H]3[C@H](O)[C@@H](O)[C@@H](O[C@H]4[C@H](O)[C@@H](O)[C@@H](O[C@H]5[C@H](O)[C@@H](O)[C@@H](O[C@H]6[C@H](O)[C@@H](O)[C@@H](O[C@H]7[C@H](O)[C@@H](O)[C@@H](O[C@H]8[C@H](O)[C@@H](O)[C@@H](O[C@H]1[C@H](O)[C@H]2O)O[C@@H]8COS(=O)(=O)O)O[C@@H]7COS(=O)(=O)O)O[C@@H]6COS(=O)(=O)O)O[C@@H]5COS(=O)(=O)O)O[C@@H]4COS(=O)(=O)O)O[C@@H]3COS(=O)(=O)O]
The dopant can be gamma cyclodextrin sulfate, having the structure:

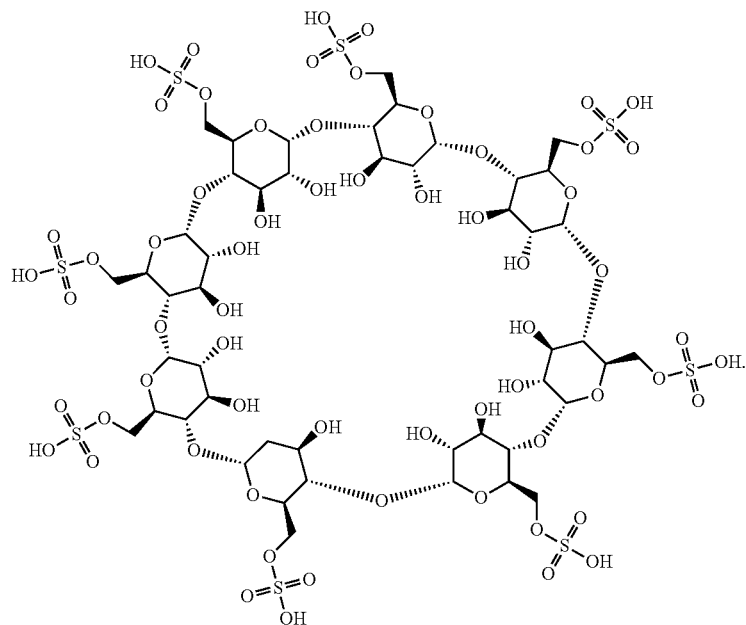 [SMILES: O=S(=O)(O)OC[C@H]1O[C@@H]2O[C@H]3[C@H](O)[C@@H](O)[C@@H](O[C@H]4[C@H](O)[C@@H](O)[C@@H](O[C@H]5[C@H](O)[C@@H](O)[C@@H](O[C@H]6[C@H](O)[C@@H](O)[C@@H](O[C@H]7[C@H](O)[C@@H](O)[C@@H](O[C@H]8[C@H](O)[C@@H](O)[C@@H](O[C@H]9[C@H](O)C[C@@H](O[C@H]1[C@H](O)[C@H]2O)O[C@@H]9COS(=O)(=O)O)O[C@@H]8COS(=O)(=O)O)O[C@@H]7COS(=O)(=O)O)O[C@@H]6COS(=O)(=O)O)O[C@@H]5COS(=O)(=O)O)O[C@@H]4COS(=O)(=O)O)O[C@@H]3COS(=O)(=O)O]

In various embodiments, the dopant is chosen from 2-[2-(2-methoxyethoxy)ethoxy]acetic acid, methoxypolyethylene glycol 5,000 acetic acid, methoxypolyethylene glycol 5,000 propionic acid, O-(2-carboxyethyl)-O'-methyl-undecaethylene glycol. O-methyl-O'-succinylpolyethylene glycol 2,000. O-methyl-O'-succinylpolyethylene glycol 5,000, O-[2-(3-succinylamino)ethyl]-O'-methyl-polyethylene glycol having an $M_n$ of about 20,000, polyacrylic acid, polymethacrylic acid, p-sulfonatocalix[4]arene, p-sulfonatocalix[6]arene, p-sulfonatocalix[8]arene, alpha cyclodextrin sulfate, beta cyclodextrin sulfate, gamma cyclodextrin sulfate, a salt thereof, and a combination thereof.

Composition Including the Doped Polyaniline.

Various embodiments of the present invention provide a composition including the doped polyaniline. The composition can be any suitable composition that includes an embodiment of the doped polyaniline described herein. In some embodiments, the composition can be suitable for forming a glove, such as via dipping of a hand-shaped form in the composition and subsequent exposure to conditions sufficient to vulcanize the composition. The composition can include any suitable amount of, or can be free of, any one or more materials described in this section.

The composition can include one doped polyaniline, or more than one doped polyaniline. Any suitable proportion of the composition can be the one or more doped polyanilines, such as about 0.001 wt % to about 99.999 wt % of the composition, or about 5 wt % to about 10 wt % of the composition, or about 0.001 wt % or less, or less than, equal to, or greater than about 0.01 wt %, 0.1, 1, 2, 3.4, 4.5, 5, 5.5, 6, 6.5, 7, 7.5, 8, 8.5, 9, 9.5, 10, 10.5, 11, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99, or about 99.999 wt % or more.

The composition can include a resin. The composition can include one resin, or more than one resin. The resin can be any suitable resin, such as natural or synthetic rubbers or polymers, or a combination thereof. The resin can be a chemical resistant polymer or a material curable to become a chemical resistant polymer. The resin can be polyvinyl chloride (PVC), chlorinated polyvinyl chloride (CPVC), polyvinyl alcohol, natural rubber, natural latex, a polyolefin, nitrile rubber, nitrile latex, chloroprene latex, butyl latex, fluoric latex, polyurethane, polychloroprene rubber, butyl rubber, fluorine rubber, or a combination thereof. The one or more resins can form any suitable proportion of the composition, such as about 0.01 wt % to about 99.99 wt % of the composition, about 85 wt % to about 90 wt % of the composition, about 90 wt % to about 99 wt %, about 85 wt % to about 99 wt %, or about 0.01 wt % or less, or less than, equal to, or greater than about 0.1 wt %, 1, 2, 3, 4, 5, 6, 8, 10, 12, 14, 16, 18, 20, 25, 30, 35, 40, 45, 50, 55, 60, 65, 70, 75, 80, 82, 84, 84.5, 85, 85.5, 86, 86.5, 87, 87.5, 88, 88.5, 90, 90.5, 91, 91.5, 92, 92.5, 93, 93.5, 94, 94.5, 95, 95.5, 96, 96.5, 97, 97.5, 98, 98.5, 99, 99.5, 99.9, or about 99.99 wt % or more.

The composition can include a flame retardant. The composition can include one flame retardant, or more than one flame retardant. The flame retardant can be any suitable flame retardant or a combination thereof. The flame retardant can be chlorinated polyvinyl chloride (CPVC) or minerals, such as, aluminum hydroxide, magnesium hydroxide, huntite, hydromagnesite, or a combination thereof. The one or more flame retardants can form any suitable proportion of the composition, such as about 0.01 wt % to about 99.99 wt % of the composition, about 0.1 wt % to about 0.3 wt % of the composition, or less than, equal to, or greater than about 0.05 wt %, 0.075, 0.1, 0.125, 0.15, 0.175, 0.2, 0.225, 0.25, 0.275, 0.3, 0.4, 0.5, 0.6, 0.7, 0.8, 0.9, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or about 99.99 wt % or more.

The composition can include a plasticizer. The composition can include one plasticizer, or more than one plasticizer. The plasticizer can be any suitable plasticizer or a combination thereof. The plasticizer can be glycerol, polyethylene glycol, diisohexyl phthalate, diisooctyl phthalate, or a combination thereof. The one or more plasticizers can form any suitable proportion of the composition, such as about 0.01 wt % to about 99.99 wt % of the composition, about 0.1 wt % to about 50 wt %, about 0.1 wt % to about 0.2 wt % of the composition, or less than, equal to, or greater than about 0.05 wt %, 0.075, 0.1, 0.125, 0.15, 0.175, 0.2, 0.225, 0.25, 0.3, 0.4, 0.5, 0.6, 0.7, 0.8, 0.9, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or about 99.99 wt % or more.

The composition can include a lubricant. The composition can include one lubricant, or more than one lubricant. The lubricant can be any suitable lubricant or a combination thereof. The lubricant can be stearic acid, long chain fatty acids and their calcium and magnesium salt, or a combination thereof. The one or more lubricants can form any suitable proportion of the composition, such as about 0.01 wt % to about 99.99 wt % of the composition, about 0.1 wt % to about 0.2 wt % of the composition, or less than, equal to, or greater than about 0.05 wt %, 0.075, 0.1, 0.125, 0.15, 0.175, 0.2, 0.225, 0.25, 0.3, 0.4, 0.5, 0.6, 0.7, 0.8, 0.9, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or about 99.99 wt % or more.

The composition can include an antimicrobial agent. The composition can include one antimicrobial agent, or more than one antimicrobial agent. The antimicrobial agent can be any suitable antimicrobial agent or a combination thereof. The antimicrobial agent can be citric acid, lactic acid, sorbic acid, or a combination thereof. The one or more antimicrobial agents can form any suitable proportion of the composition, such as about 0.01 wt % to about 99.99 wt % of the composition, about 0.1 wt % to about 0.2 wt % of the composition, or less than, equal to, or greater than about 0.05 wt %, 0.075, 0.1, 0.125, 0.15, 0.175, 0.2, 0.225, 0.25, 0.3, 0.4, 0.5, 0.6, 0.7, 0.8, 0.9, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or about 99.99 wt % or more.

The composition can be formed by combining the doped polyaniline, resin, flame retardant, plasticizer, lubricant and antimicrobial agent, as well as any other components. One or more of the components can be dispersed in a solvent, such as, for example, water or an organic solvent such as an alcohol, methyl vinyl ketone, dimethylformamide (DMF), or any combination thereof.

The composition can include a curable material, a resin, a surfactant, an accelerator, a dispersant, a crystalline silica compound, an amorphous silica, a salt, a fiber, water, an aqueous base, an aqueous acid, an alcohol or polyol, a cellulose, a starch, an alkalinity control agent, an acidity control agent, a density control agent, a density modifier, an emulsifier, a polymeric stabilizer, a crosslinking agent, a polyacrylamide, a polymer or combination of polymers, an antioxidant, a heat stabilizer, a solvent, a diluent, a plasticizer, a filler or inorganic particle, a thickener, pigment, a dye, a rheology modifier, or a combination thereof. Any one or more materials described in this paragraph can form any suitable proportion of the composition, such as about 0.01 wt % to about 99.99 wt % of the composition, or less than, equal to, or greater than about 0.1 wt %, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or about 99.99 wt % or more.

Glove.

In various embodiments, the present invention provides a glove. The glove can be any suitable glove that includes an embodiment of the doped polyaniline described herein, a vulcanization product thereof, an embodiment of the composition including the doped polyaniline described herein, or a vulcanization product thereof.

In various embodiments, the present invention provides a method of making a glove. The method can be any suitable method that forms a glove that includes an embodiment of the doped polyaniline described herein, a vulcanization product thereof, an embodiment of the composition including the doped polyaniline described herein, or a vulcanization product thereof. The method can include dipping a hand-shaped former (e.g., a hand-shape make of ceramic or another suitable material) into a composition including the doped polyaniline and subjecting the coated hand-shaped former to conditions sufficient to vulcanize the composition to form the glove, which can then be removed from the hand-shaped former. In some embodiments, a liner can be attached to the glove.

Method of Making a Doped Polyaniline.

Various embodiments of the present invention provide a method of making a doped polyaniline. The method can include doping an emeraldine free base with any embodiment of a dopant described herein. The doping can include contacting the emeraldine free base with the dopant under conditions such that the emeraldine is protonated by the dopant and such that the cationic species formed from the protonation is forms an ion pair with the conjugate base of the dopant.

EXAMPLES

Various embodiments of the present invention can be better understood by reference to the following Examples which are offered by way of illustration. The present invention is not limited to the Examples given herein.

Example 1

Polyacrylic Acid Doping Agent. (Hypothetical Example)

Undoped PANI (free base) was prepared by chemically oxidizing aniline with ammonium peroxydisulfate, as shown in Scheme 1.

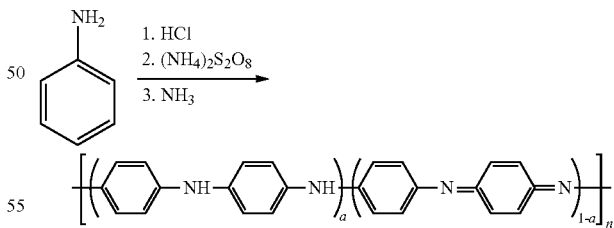

Scheme 1. Synthesis of emeraldine free base.

The aniline was dissolved in deionized water. Hydrochloric acid was then added in the solution. The mixture was stirred in an ice bath for two hours. After the addition of ammonium peroxydisulfate, the new mixture was covered and placed in a refrigerator at 2° C. for 6 hours. Afterwards, the mixture was diluted in water, the PANI precipitate was filtered, washed with 1 L of distilled water, washed again with a solution of 30% ammonium hydroxide and, finally, washed for a second time with distilled water. The powder was dried in an oven, at 90° C., for 6 hours.

Polyacrylic acid was chosen as doping agent for PANI. The synthesis of the doped polyaniline is shown in Scheme 2.

Scheme 2. Synthesis of doped polyaniline.

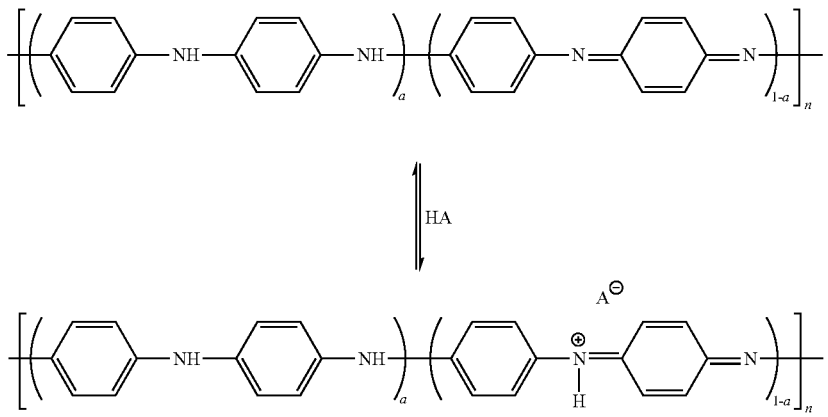

PANI in the emeraldine form (0.5 g) was placed in 200 mL dimethylformamide, which contained 0.5 g of polyacrylic acid, and stirred for 24 hours at room temperature. The doped PANI was then filtered and rinsed with water and tetrahydrofuran in order to remove the unreacted polyacrylic acid.

Resin, flame retardant, plasticizer, lubricant, antimicrobial agent were dispersed in water. The filtered PANI solution was blended with the water-based solution containing the resin and the other ingredients using mild agitation, in order to obtain the antistatic mixture. The antistatic mixture contained 91.7 wt % resin, 7.5 wt % doped polyaniline, 0.2 wt % flame retardant, 0.2 wt % plasticizer, 0.2 wt % lubricant, and 0.2 wt % antimicrobial agent.

Gloves were formed from the mixture using the following steps. A hand-shaped former (HSF) was cleaned in sequence of acid, water, and surfactant. The cleaned HSF was immersed in a coagulant solution based on calcium nitrate in order to obtain a thin coagulant film on the HSF. The film-coated HSF was then dip coated in the antistatic mixture. The coating on the HSF was vulcanized.

Example 2

Alpha Cyclodextrin Sulfate as Doping Agent. (Hypothetical Example)

Undoped PANI (free base) was prepared by chemically oxidizing aniline with ammonium peroxydisulfate, as shown in Scheme 1.

The aniline was dissolved in deionized water. Hydrochloric acid was then added in the solution. The mixture was stirred in an ice bath for two hours. After the addition of ammonium peroxydisulfate, the new mixture was covered and placed in a refrigerator at 2° C., for 6 hours. Afterwards, the mixture was diluted in water, the PANI precipitate was filtered, washed with 1 L of distilled water, washed again with a solution of 30% ammonium hydroxide, and washed for a second time with distilled water. The powder was dried in an oven, at 90° C., for 6 hours.

Alpha cyclodextrin sulfate was chosen as doping agent for PANI. The synthesis of the doped polyaniline is shown in Scheme 2.

PANI in the emeraldine form (1 g) was placed in 200 mL dimethylformamide, which contained 1 g of alpha cyclodextrin sulfate, and stirred for 24 hours at room temperature.

After that, the doped PANI was filtered and rinsed with water and tetrahydrofuran.

Resin, flame retardant, plasticizer, lubricant, antimicrobial agent were dispersed in water. The filtered PANI solution was blended with the water-based solution containing the resin and the other ingredients using mild agitation, in order to obtain the antistatic mixture. The antistatic mixture contained 90 wt % resin, 9.3 wt % doped polyaniline, 0.25 wt % flame retardant, 0.15 wt % plasticizer, 0.15 wt % lubricant, and 0.15 wt % antimicrobial agent.

Gloves were formed from the mixture using the following steps. A hand-shaped former (HSF) was cleaned in sequence of acid, water, and surfactant. The cleaned HSF was immersed in a coagulant solution based on calcium nitrate in order to obtain a thin coagulant film on the HSF. The film-coated HSF was then dip coated in the antistatic mixture. The coating on the HSF was vulcanized.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a doped polyaniline comprising a dopant that is a polymer comprising a repeating unit that has the structure:

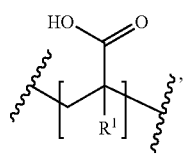

or a salt thereof.
wherein R¹ is chosen from —H and —CH₃;
a compound having the structure:

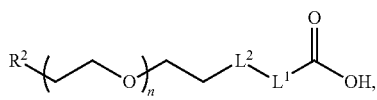

or a salt thereof,
wherein
R² is chosen from substituted or unsubstituted ($C_1$-$C_{10}$) hydrocarbyl- and substituted or unsubstituted ($C_1$-$C_{10}$) hydrocarbyl-O—,
L¹ is substituted or unsubstituted ($C_1$-$C_{10}$)hydrocarbylene,
L² is chosen from a bond, —O—, —O—C(O)—, and —NH—C(O)—, and
n is about 1 to about 100,000;
a sulfonatocalixarene, or a salt thereof;
a cyclodextrin sulfate, or a salt thereof; or
a combination thereof.

Embodiment 2 provides the doped polyaniline of Embodiment 1, wherein the doped polyaniline comprises a repeating group having the structure:

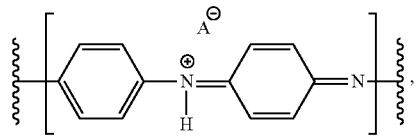

wherein A⁻ is the conjugate base of the dopant, the dopant having the structure A-H or a salt thereof.

Embodiment 3 provides the doped polyaniline of Embodiment 1, wherein the doped polyaniline comprises repeating groups having the structure:

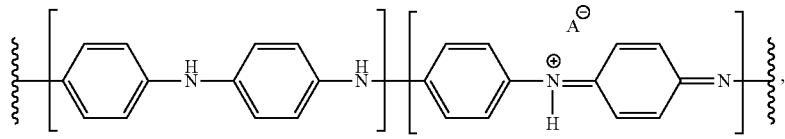

wherein
the repeating groups are in block or random arrangement,
A⁻ is the conjugate base of the dopant, the dopant having the structure A-H or a salt thereof.

Embodiment 4 provides the doped polyaniline of any one of Embodiments 1-3, wherein the dopant is about 0.001 wt % to about 99.999 wt % of the doped polyaniline.

Embodiment 5 provides the doped polyaniline of any one of Embodiments 1-3, wherein the dopant is about 40 wt % to about 60 wt % of the polyaniline.

Embodiment 6 provides the doped polyaniline of any one of Embodiments 1-5, wherein the dopant is hygroscopic.

Embodiment 7 provides the doped polyaniline of any one of Embodiments 1-6, wherein the doped polyaniline is conductive.

Embodiment 8 provides the doped polyaniline of any one of Embodiments 1-7, wherein the doped polyaniline has a conductivity of about $10^{-10}$ S/cm to about 10 S/cm.

Embodiment 9 provides the doped polyaniline of any one of Embodiments 1-8, wherein the polyaniline has a molecular weight of about 1,000 to about 1,000,000.

Embodiment 10 provides the doped polyaniline of any one of Embodiments 1-8, wherein the polyaniline has a molecular weight of about 5,000 to about 100,000.

Embodiment 11 provides the doped polyaniline of any one of Embodiments 1-8, wherein the polyaniline has a molecular weight of about 40,000 to 60,000.

Embodiment 12 provides the doped polyaniline of any one of Embodiments 1-11, wherein R¹ is —H.

Embodiment 13 provides the doped polyaniline of any one of Embodiments 1-11, wherein R¹ is —CH₃.

Embodiment 14 provides the doped polyaniline of any one of Embodiments 1-13, wherein R² is chosen from ($C_1$-$C_{10}$)alkyl- and ($C_1$-$C_{10}$)alkyl-O—.

Embodiment 15 provides the doped polyaniline of any one of Embodiments 1-13, wherein R² is chosen from H₃C— and H₃C—O—.

Embodiment 16 provides the doped polyaniline of any one of Embodiments 1-15, wherein L¹ is ($C_1$-$C_{10}$)alkylene.

Embodiment 17 provides the doped polyaniline of any one of Embodiments 1-15, wherein L¹ is chosen from methylene and ethylene.

Embodiment 18 provides the doped polyaniline of any one of Embodiments 1-17, wherein n is about 1 to about 10,000.

Embodiment 19 provides the doped polyaniline of any one of Embodiments 1-18, wherein the dopant is chosen from 2-[2-(2-methoxyethoxy)ethoxy]acetic acid, methoxypolyethylene glycol 5,000 acetic acid, methoxypolyethylene glycol 5,000 propionic acid, O-(2-carboxyethyl)-O'-methyl-undecaethylene glycol, O-methyl-O'-succinylpolyethylene glycol 2,000, O-methyl-O'-succinylpolyethylene glycol 5,000. O-[2-(3-succinylamino)ethyl]-O'-methyl-polyethylene glycol having an $M_n$ of about 20,000, polyacrylic acid, polymethacrylic acid, and combinations thereof.

Embodiment 20 provides the doped polyaniline of any one of Embodiments 1-18, wherein the dopant is a p-sulfonatocalix[n]arene, or a salt thereof, wherein n is an even integer that is from 4 to about 100.

Embodiment 21 provides the doped polyaniline of any one of Embodiments 1-18, wherein the dopant is chosen from p-sulfonatocalix[4]arene, p-sulfonatocalix[6]arene, p-sulfonatocalix[8]arene, a salt thereof, and a combination thereof.

Embodiment 22 provides the doped polyaniline of any one of Embodiments 1-18, wherein the dopant is chosen from alpha cyclodextrin sulfate, beta cyclodextrin sulfate, gamma cyclodextrin sulfate, a salt thereof, and a combination thereof.

Embodiment 23 provides the doped polyaniline of any one of Embodiments 1-18, wherein the dopant is a polyacrylic acid, having a repeating group having the structure:

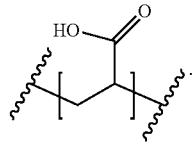

Embodiment 24 provides the doped polyaniline of any one of Embodiments 1-18, wherein the dopant is polymethacrylic acid, comprising a repeating unit having the structure:

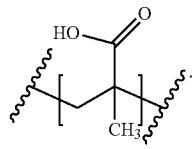

Embodiment 25 provides the doped polyaniline of any one of Embodiments 1-18, wherein the dopant is 2-[2-(2-methoxyethoxy)ethoxy]acetic acid, having the structure:

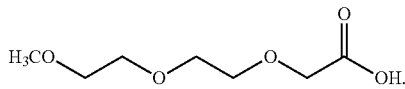 [SMILES: COCCOCCOCC(=O)O]

Embodiment 26 provides the doped polyaniline of any one of Embodiments 1-18, wherein the dopant is methoxypolyethylene glycol acetic acid, having the structure:

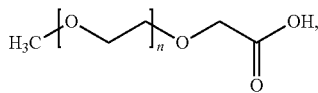

wherein n is about 5,000.

Embodiment 27 provides the doped polyaniline of any one of Embodiments 1-18, wherein the dopant is methoxypolyethylene glycol propionic acid, having the structure:

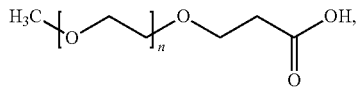

wherein n is about 5,000.

Embodiment 28 provides the doped polyaniline of any one of Embodiments 1-18, wherein the dopant is O-(2-carboxyethyl)-O'-methyl-undecaethylene glycol, having the structure:

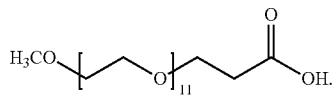

Embodiment 29 provides the doped polyaniline of any one of Embodiments 1-18, wherein the dopant is O-methyl-O'-succinylpolyethylene glycol, having the structure:

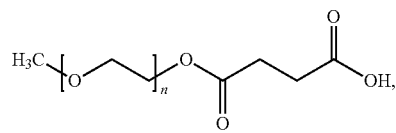

wherein n is about 2,000.

Embodiment 30 provides the doped polyaniline of any one of Embodiments 1-18, wherein the dopant is O-methyl-O'-succinylpolyethylene glycol, having the structure:

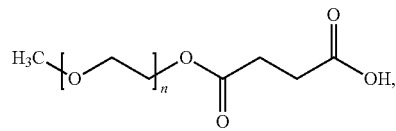

wherein n is about 5,000.

Embodiment 31 provides the doped polyaniline of any one of Embodiments 1-18, wherein the dopant is O-[2-(3-succinylamino)ethyl]-O'-methyl-polyethylene glycol, having the structure:

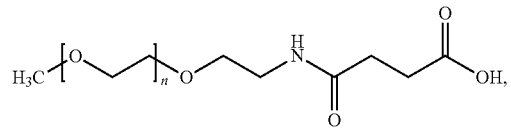

wherein n is about 450.

Embodiment 32 provides the doped polyaniline of any one of Embodiments 1-18, wherein the dopant is p-sulfonatocalix[4]arene, having the structure:

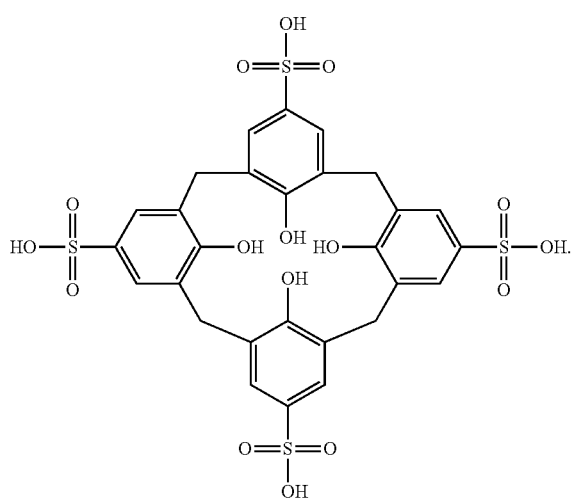 [SMILES: O=S(=O)(O)c1cc2c(O)c(c1)Cc1cc(S(=O)(=O)O)cc(c1O)Cc1cc(S(=O)(=O)O)cc(c1O)Cc1cc(S(=O)(=O)O)cc(c1O)C2]

Embodiment 33 provides the doped polyaniline of any one of Embodiments 1-18, wherein the dopant is p-sulfonatocalix[6]arene, having the structure:

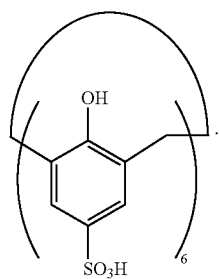

Embodiment 34 provides the doped polyaniline of any one of Embodiments 1-18, wherein the dopant is p-sulfonatocalix[8]arene, having the structure:

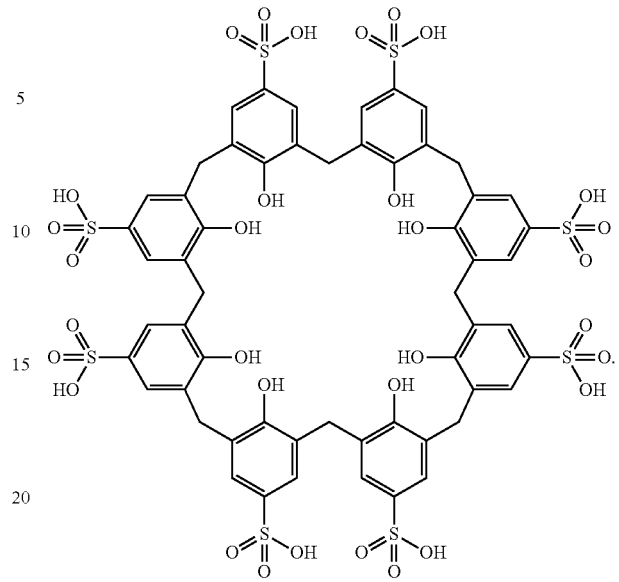

Embodiment 35 provides the doped polyaniline of any one of Embodiments 1-18, wherein the dopant is alpha cyclodextrin sulfate, having the structure:

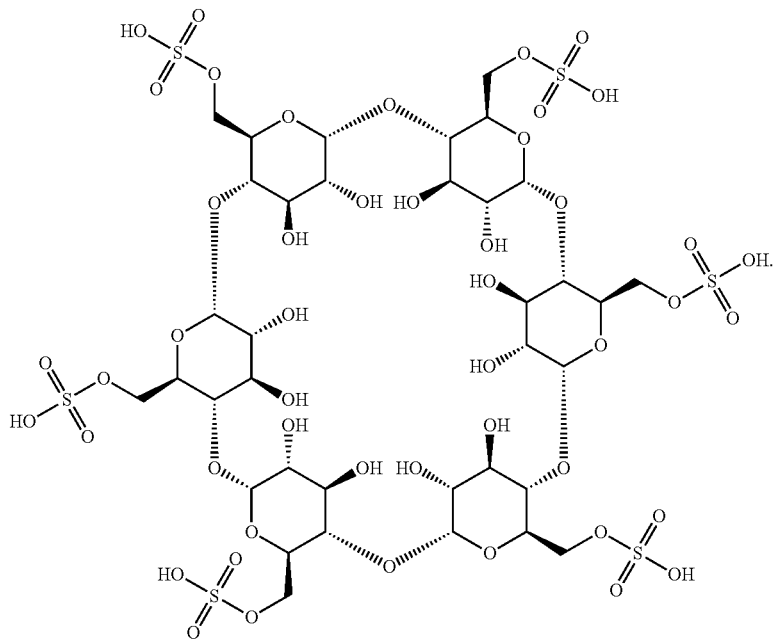 [SMILES: O=S(=O)(O)OC[C@H]1O[C@@H]2O[C@H]3[C@H](O)[C@@H](O)[C@@H](O[C@H]4[C@H](O)[C@@H](O)[C@@H](O[C@H]5[C@H](O)[C@@H](O)[C@@H](O[C@H]6[C@H](O)[C@@H](O)[C@@H](O[C@H]7[C@H](O)[C@@H](O)[C@@H](O[C@H]1[C@H](O)[C@H]2O)O[C@@H]7COS(=O)(=O)O)O[C@@H]6COS(=O)(=O)O)O[C@@H]5COS(=O)(=O)O)O[C@@H]4COS(=O)(=O)O)O[C@@H]3COS(=O)(=O)O]

Embodiment 36 provides the doped polyaniline of any one of Embodiments 1-18, wherein the dopant is beta cyclodextrin sulfate, having the stucture:

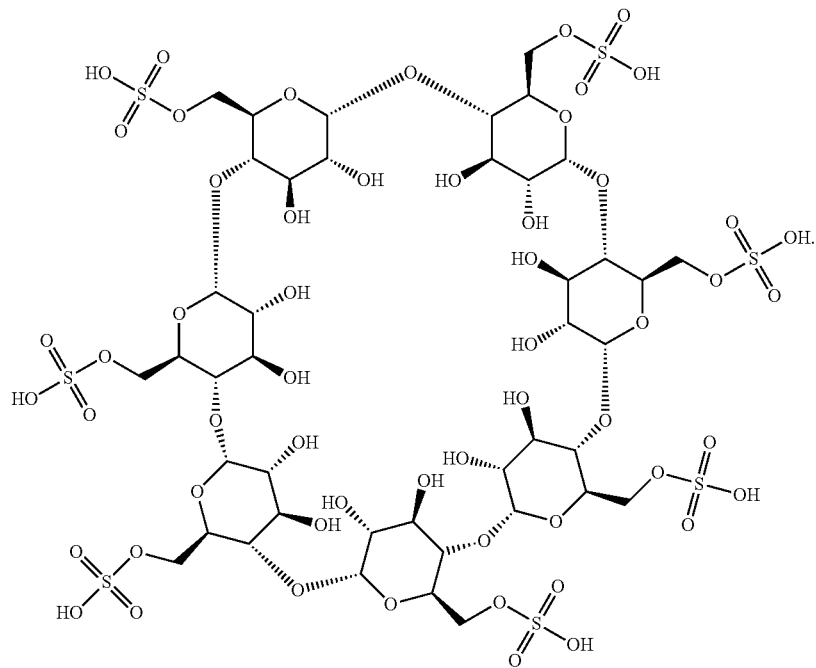
Embodiment 37 provides the doped polyaniline of any one of Embodiments 1-18, wherein the dopant is gamma cyclodextrin sulfate, having the structure:
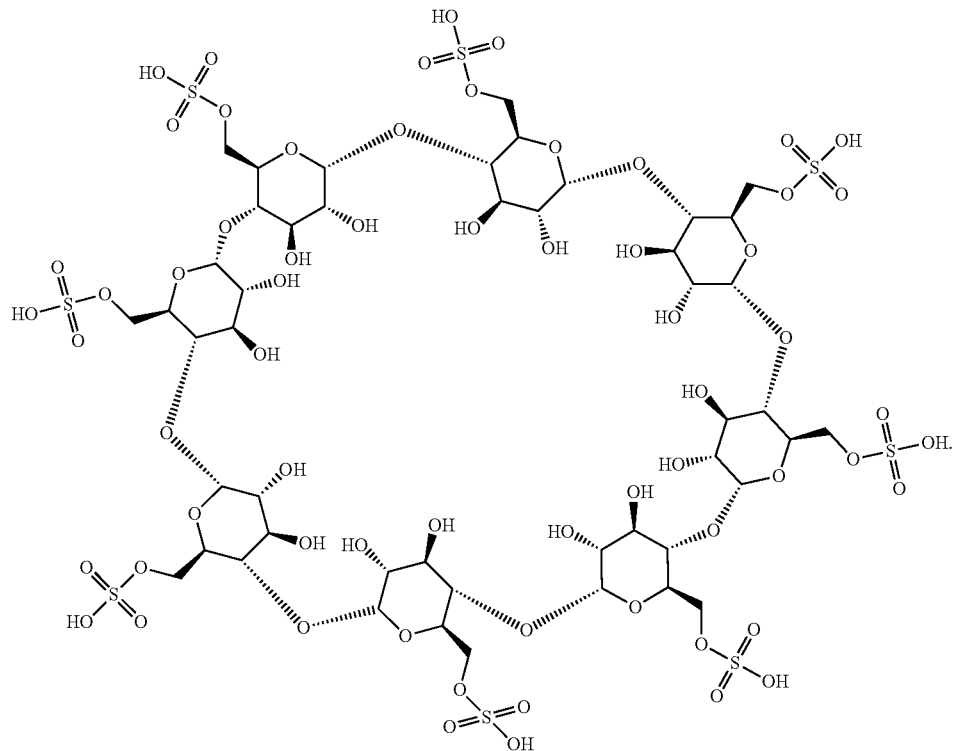
Embodiment 38 provides a glove comprising the doped polyaniline of any one of Embodiments 1-37.
Embodiment 39 provides a composition comprising the doped polyaniline of any one of Embodiments 1-37.

Embodiment 40 provides the composition of Embodiment 39, wherein the doped polyaniline is about 0.001 wt % to about 99.999 wt % of the composition.

Embodiment 41 provides the composition of Embodiment 39, wherein the doped polyaniline is about 5 wt % to about 10 wt % of the composition.

Embodiment 42 provides a glove comprising a vulcanization product of the composition of Embodiment 39.

Embodiment 43 provides the composition of any one of Embodiments 39-42, wherein the composition further comprises a resin.

Embodiment 44 provides the composition of Embodiment 43, wherein the resin is a natural rubber, a synthetic rubber, a polymer, or a combination thereof.

Embodiment 45 provides the composition of Embodiment 44, wherein the resin is polyvinyl chloride (PVC), chlorinated polyvinyl chloride (CPVC), polyvinyl alcohol, natural rubber, natural latex, a polyolefin, nitrile rubber, nitrile latex, chloroprene latex, butyl latex, fluoric latex, polyurethane, polychloroprene rubber, butyl rubber, fluorine rubber, a combination thereof, or a material curable to form any one of the foregoing.

Embodiment 46 provides the composition of any one of Embodiments 43-45, wherein the resin is about 0.01 wt % to about 99.99 wt % of the composition.

Embodiment 47 provides the composition of any one of Embodiments 43-45, wherein the resin is about 85 wt % to about 99 wt % of the composition.

Embodiment 48 provides the composition of any one of Embodiments 39-47, wherein the composition further comprises a flame retardant.

Embodiment 49 provides the composition of Embodiment 48, wherein the flame retardant is a mineral.

Embodiment 50 provides the composition of Embodiment 48, wherein the flame retardant is chlorinated polyvinyl chloride (CPVC), aluminum hydroxide, magnesium hydroxide, huntite, hydromagnesite, or a combination thereof.

Embodiment 51 provides the composition of any one of Embodiments 48-50, wherein the flame retardant is about 0.01 wt % to about 99.99 wt % of the composition.

Embodiment 52 provides the composition of any one of Embodiments 48-50, wherein the flame retardant is about 0.01 wt % to about 99.99 wt % of the composition.

Embodiment 53 provides the composition of any one of Embodiments 39-52, wherein the composition further comprises a plasticizer.

Embodiment 54 provides the composition of Embodiment 53, wherein the plasticizer is glycerol, polyethylene glycol, diisohexyl phthalate, diisooctyl phthalate, or a combination thereof.

Embodiment 55 provides the composition of any one of Embodiments 53-54, wherein the plasticizer is 0.01 wt % to about 99.99 wt % of the composition.

Embodiment 56 provides the composition of any one of Embodiments 53-54, wherein the plasticizer is about 0.1 wt % to about 0.2 wt % of the composition.

Embodiment 57 provides the composition of any one of Embodiments 39-56, wherein the composition further comprises a lubricant.

Embodiment 58 provides the composition of Embodiment 57, wherein the lubricant is stearic acid, a long chain fatty acid and their calcium and magnesium salt, or a combination thereof.

Embodiment 59 provides the composition of any one of Embodiments 57-58, wherein the lubricant is 0.01 wt % to about 99.99 wt % of the composition.

Embodiment 60 provides the composition of any one of Embodiments 57-58, wherein the lubricant is about 0.1 wt % to about 0.2 wt % of the composition.

Embodiment 61 provides the composition of any one of Embodiments 39-60, wherein the composition further comprises an antimicrobial agent.

Embodiment 62 provides the composition of Embodiment 61, wherein the antimicrobial agent is an acid.

Embodiment 63 provides the composition of Embodiment 61, wherein the antimicrobial agent is citric acid, lactic acid, sorbic acid, or a combination thereof.

Embodiment 64 provides the composition of any one of Embodiments 61-63, wherein the antimicrobial agent is 0.01 wt % to about 99.99 wt % of the composition.

Embodiment 65 provides the composition of any one of Embodiments 61-63, wherein the antimicrobial agent is about 0.1 wt % to about 0.2 wt % of the composition.

Embodiment 66 provides the composition of any one of Embodiments 39-65, wherein the composition further comprises at least one of a curable material, a resin, a surfactant, an accelerator, a dispersant, a crystalline silica compound, an amorphous silica, a salt, a fiber, water, an aqueous base, an aqueous acid, an alcohol or polyol, a cellulose, a starch, an alkalinity control agent, an acidity control agent, a density control agent, a density modifier, an emulsifier, a polymeric stabilizer, a crosslinking agent, a polyacrylamide, a polymer or combination of polymers, an antioxidant, a heat stabilizer, a solvent, a diluent, a plasticizer, a filler or inorganic particle, a thickener, a pigment, a dye, a rheology modifier, or a combination thereof.

Embodiment 67 provides a method of making a glove, the method comprising dipping a hand-shaped former into the composition of any one of Embodiments 39-66 to form a coated hand-shaped former. The method further comprises exposing the coated hand-shaped former to conditions sufficient to vulcanize the composition to form a glove and removing the glove from the hand-shaped former.

Embodiment 68 provides a doped polyaniline comprising a dopant that is chosen from 2-[2-(2-methoxyethoxy) ethoxy]acetic acid, methoxypolyethylene glycol 5,000 acetic acid, methoxypolyethylene glycol 5,000 propionic acid. O-(2-carboxyethyl)-O'-methyl-undecaethylene glycol, O-methyl-O'-succinylpolyethylene glycol 2,000, O-methyl-O'-succinylpolyethylene glycol 5,000. O-[2-(3-succinylamino)ethyl]-O'-methyl-polyethylene glycol having an $M_n$ of about 20,000, polyacrylic acid, polymethacrylic acid, p-sulfonatocalix[4]arene, p-sulfonatocalix[6]arene, p-sulfonatocalix[8]arene, alpha cyclodextrin sulfate, beta cyclodextrin sulfate, gamma cyclodextrin sulfate, a salt thereof, and a combination thereof.

Embodiment 69 provides a method of making a doped polyaniline, the method comprising doping an emeraldine free base with a dopant that is:

a polymer comprising a repeating unit that has the structure:

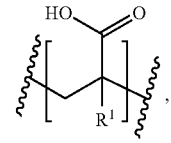

or a salt thereof, wherein $R^1$ is chosen from —H and —CH$_3$;

a compound having the structure:

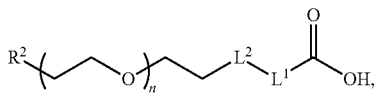

or a salt thereof,
wherein
R² is chosen from substituted or unsubstituted (C₁-C₁₀) hydrocarbyl- and substituted or unsubstituted (C₁-C₁₀)hydrocarbyl-O—.
L¹ is substituted or unsubstituted (C₁-C₁₀)hydrocarbylene.
L² is chosen from a bond, —O—, —O—C(O)—, and —NH—C(O)—, and
n is about 1 to about 100,000;
a sulfonatocalixarene, or a salt thereof;
a cyclodextrin sulfate, or a salt thereof; or
a combination thereof.

Embodiment 70 provides a glove comprising a vulcanization product of a composition comprising a polyaniline comprising a dopant, the dopant comprising: a polymer comprising a repeating unit that has the structure:

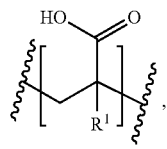

or a salt thereof,
wherein R¹ is chosen from —H and —CH₃;
a compound having the structure:

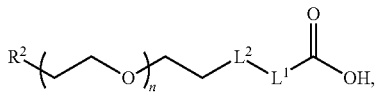

or a salt thereof,
wherein
R² is chosen from substituted or unsubstituted (C₁-C₁₀) hydrocarbyl- and substituted or unsubstituted (C₁-C₁₀) hydrocarbyl-O—,
L¹ is substituted or unsubstituted (C₁-C₁₀)hydrocarbylene,
L² is chosen from a bond, —O—, —O—C(O)—, and —NH—C(O)—, and
n is about 1 to about 100,000;
a sulfonatocalixarene, or a salt thereof;
a cyclodextrin sulfate, or a salt thereof; or
a combination thereof.

Embodiment 71 provides a glove comprising a vulcanization product of a composition comprising a polyaniline comprising a dopant that is chosen from 2-[2-(2-methoxyethoxy)ethoxy]acetic acid, methoxypolyethylene glycol 5,000 acetic acid, methoxypolyethylene glycol 5,000 propionic acid. O-(2-carboxyethyl)-O'-methyl-undecaethylene glycol, O-methyl-O'-succinylpolyethylene glycol 2,000, O-methyl-O'-succinylpolyethylene glycol 5,000, O-[2-(3-succinylamino)ethyl]-O'-methyl-polyethylene glycol having an Mₙ of about 20,000, polyacrylic acid, polymethacrylic acid, p-sulfonatocalix[4]arene, p-sulfonatocalix[6]arene, p-sulfonatocalix[8]arene, alpha cyclodextrin sulfate, beta cyclodextrin sulfate, gamma cyclodextrin sulfate, a salt thereof, and a combination thereof.

Embodiment 72 provides the doped polyaniline, composition, glove, or method of any one or any combination of Embodiments 1-71 optionally configured such that all elements or options recited are available to use or select from.

What is claimed is:
1. A doped polyaniline comprising a dopant that is:
a polymer comprising
a compound having the structure:

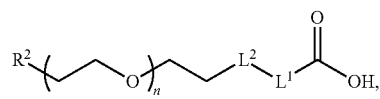

or a salt thereof,
wherein
R² is chosen from substituted or unsubstituted (C₁-C₁₀) hydrocarbyl- and substituted or unsubstituted (C₁-C₁₀) hydrocarbyl-O—,
L¹ is substituted or unsubstituted (C₁-C₁₀)hydrocarbylene,
L² is chosen from a bond, —O—, —O—C(O)—, and —NH—C(O)—, and
n is about 1 to about 100,000;
p-sulfonatocalix[n]arene or a salt thereof, wherein n is an even integer that is from 10 to about 100;
or
a combination thereof.

2. The doped polyaniline of claim 1, wherein the doped polyaniline comprises a repeating group having the structure:

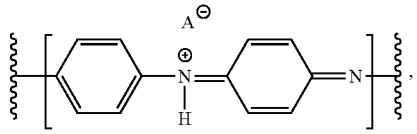

wherein A⁻ is the conjugate base of the dopant, the dopant having the structure A-H or a salt thereof.

3. The doped polyaniline of claim 1, wherein the dopant is hygroscopic.

4. The doped polyaniline of claim 1, wherein the doped polyaniline is conductive.

5. The doped polyaniline of claim 4, wherein the doped polyaniline has a conductivity of about $10^{-10}$ S/cm to about 10 S/cm.

6. The doped polyaniline of claim 1, wherein the dopant is the compound which comprises 2-[2-(2-methoxyethoxy)ethoxy]acetic acid, methoxypolyethylene glycol 5,000 acetic acid, methoxypolyethylene glycol 5,000 propionic acid, O-(2-carboxyethyl)-O'-methyl-undecaethylene glycol, O-methyl-O'-succinylpolyethylene glycol 2,000, O-methyl-O'-succinylpolyethylene glycol 5,000, O-[2-(3-succinylamino)ethyl]-O'-methyl-polyethylene glycol having an Mₙ of about 20,000;
or wherein the dopant further comprises a polymer comprising a repeating unit that has the structure:

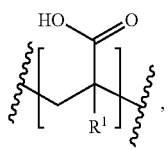

or a salt thereof,
wherein R¹ is chosen from —H and —CH₃;
a cyclodextrin sulfate, or salts thereof;
or comprises combinations thereof.

7. The doped polyaniline of claim 1, wherein the dopant further comprises p-sulfonatocalix[4]arene, p-sulfonatocalix[6]arene, p-sulfonatocalix[8]arene, a salt thereof, or a combination thereof.

8. The doped polyaniline of claim 1, wherein the dopant further comprises alpha cyclodextrin sulfate, beta cyclodextrin sulfate, gamma cyclodextrin sulfate, a salt thereof, or comprises a combination thereof.

9. The doped polyaniline of claim 1, wherein the dopant is about 40 wt % to about 60 wt % of the polyaniline.

10. A vulcanized product comprising:
a composition comprising:
a doped polyaniline comprising a dopant that is:
a compound having the structure:

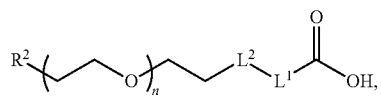

or a salt thereof
wherein R² is chosen from substituted or unsubstituted (C₁-C₁₀)hydrocarbyl- and substituted or unsubstituted (C₁-C₁₀)hydrocarbyl-O—, L¹ is substituted or unsubstituted (C₁-C₁₀)hydrocarbylene, L² is chosen from a bond, —O—, —O—C(O)—, and —NH—C(O)—, and n is about 1 to about 100,000;
p-sulfonatocalix[n]arene or a salt thereof, wherein n is an even integer that is from 10 to about 100;
or
a combination thereof; and
a resin, wherein the composition is exposed to conditions sufficient to vulcanize the composition to form the vulcanized product.

11. The vulcanized product of claim 10, wherein the doped polyaniline comprises a repeating group having the structure:

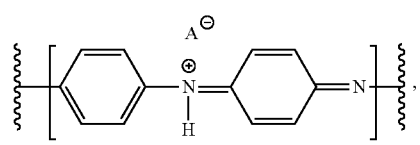

wherein A⁻ is the conjugate base of the dopant, the dopant having the structure A-H or a salt thereof.

12. The vulcanized product of claim 10, wherein the doped polyaniline is about 5 wt % to about 10 wt % of the composition.

13. The vulcanized product of claim 10, wherein the resin is about 85 wt % to about 95 wt % of the composition.

14. The vulcanized product of claim 10, wherein the resin is a natural rubber, a synthetic rubber, a polymer, or a combination thereof.

15. The vulcanized product of claim 10, wherein the resin is polyvinyl chloride (PVC), chlorinated polyvinyl chloride (CPVC), polyvinyl alcohol, natural rubber, natural latex, a polyolefin, nitrile rubber, nitrile latex, chloroprene latex, butyl latex, fluoric latex, polyurethane, polychloroprene rubber, butyl rubber, fluorine rubber, a combination thereof, or a material curable to form any one of the foregoing.

16. The vulcanized product of claim 10, wherein the composition further comprises a flame retardant, a plasticizer, a lubricant, an antimicrobial agent, or a combination thereof.

17. The vulcanized product of claim 10, wherein the product is formed by dipping a hand-shaped former into the composition, prior to exposing the composition to conditions sufficient to vulcanize the composition.

18. The product of claim 10, wherein the vulcanized product is a glove.

19. The vulcanized product of claim 10, wherein the dopant is the compound which comprises 2-[2-(2-methoxyethoxy) ethoxy]acetic acid, methoxypolyethylene glycol 5,000 acetic acid, methocypolyethylene glycol 5,000 propionic acid, O-(2-carboxyethyl)-O'-methyl-undecaethylene glycol, O-methyl-O'-succinylpolyethylene glycol 2,000, O-methyl-O'-succinylpolyethylene glycol 5,000, O-[2-(3-succinylamino)ethyl]-O'-methyl-polyethylene glycol having an $M_n$ of about 20,000;
or wherein the dopant further comprises a polymer comprising a repeating unit that has the structure:

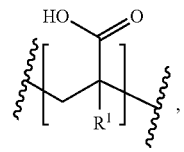

or a salt thereof,
wherein R¹ is chosen from —H and —CH₃;
or wherein the dopant further comprises p-sulfonatocalix[4]arene, p-sulfonatocalix[6]arene, p-sulfonatocalix[8]arene, a cyclodextrin sulfate, or salts thereof;
or comprises combinations thereof.

20. A method of making a glove, the method comprising:
making a doped polyaniline composition by doping an emeraldine free base with a dopant that is:
a polymer comprising a repeating unit that has the structure:

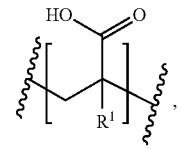

or a salt thereof,
wherein R¹ is chosen from —H and —CH₃;

a compound having the structure:

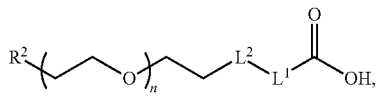

or a salt thereof,
wherein
R² is chosen from substituted or unsubstituted ($C_1$-$C_{10}$) hydrocarbyl- and substituted or unsubstituted ($C_1$-$C_{10}$) hydrocarbyl-O—,
L¹ is substituted or unsubstituted ($C_1$-$C_{10}$)hydrocarbylene,
L² is chosen from a bond, —O—, —O—C(O)—, and —NH—C(O)—, and
n is about 1 to about 100,000;
a sulfonatocalixarene, or a salt thereof;
a cyclodextrin sulfate, or a salt thereof; or
a combination thereof; and
dipping a hand-shaped former into the doped polyaniline composition to form a coated hand-shaped former;
exposing the coated hand-shaped former to conditions sufficient to vulcanize the composition to form a glove; and
removing the glove from the hand-shaped former.

21. The method of claim 20, wherein making a doped polyaniline composition includes adding a resin to the doped polyaniline.

22. The method of claim 20, wherein making a doped polyaniline composition includes adding to the doped polyaniline at least one of a flame retardant, a plasticizer, a lubricant, or an antimicrobial agent.

* * * * *